(12) United States Patent
Wood

(10) Patent No.: US 7,251,233 B2
(45) Date of Patent: Jul. 31, 2007

(54) CALL ROUTING IN A LOCATION-AWARE NETWORK

(75) Inventor: Stephen R. Wood, Beaverton, OR (US)

(73) Assignee: Intel Corporation, Santa Clara, CA (US)

( * ) Notice: Subject to any disclaimer, the term of this patent is extended or adjusted under 35 U.S.C. 154(b) by 114 days.

(21) Appl. No.: 10/178,881

(22) Filed: Jun. 24, 2002

(65) Prior Publication Data

US 2003/0235173 A1 Dec. 25, 2003

(51) Int. Cl.
*H04Q 7/24* (2006.01)
(52) U.S. Cl. ...................................... 370/338
(58) Field of Classification Search ............... 370/270, 370/271, 328, 338, 352, 401
See application file for complete search history.

(56) References Cited

U.S. PATENT DOCUMENTS

| | | | |
|---|---|---|---|
| 6,031,862 A | 2/2000 | Fullerton et al. ........... 375/200 |
| 6,404,874 B1 | 6/2002 | Chestnut ................ 379/211.02 |
| 6,463,145 B1* | 10/2002 | O'Neal et al. ......... 379/211.02 |
| 7,023,356 B2* | 4/2006 | Burkhardt et al. .......... 342/118 |
| 2003/0007473 A1* | 1/2003 | Strong et al. ............... 370/338 |
| 2003/0100319 A1* | 5/2003 | Contractor .................. 455/461 |
| 2004/0082296 A1* | 4/2004 | Twitchell, Jr. ............. 455/41.2 |
| 2005/0215280 A1* | 9/2005 | Twitchell, Jr. ........... 455/553.1 |

FOREIGN PATENT DOCUMENTS

| DE | 19706000 | 8/1998 |
|---|---|---|
| WO | WO-01/31965 | 5/2001 |

* cited by examiner

*Primary Examiner*—Chi Pham
*Assistant Examiner*—Anh-Vu Ly
(74) *Attorney, Agent, or Firm*—Schwegman, Lundberg, Woessner & Kluth, P.A.

(57) ABSTRACT

A wireless network may report the location of assets to a call routing apparatus to aid in the routing of calls.

21 Claims, 5 Drawing Sheets

CALL ROUTING IN A LOCATION-AWARE NETWORK

BACKGROUND

Many office buildings have a large number of telephones in cubicles, offices, and in common areas. When a call comes in for an intended recipient that is not near the telephone, the telephone typically rings many times before stopping, possibly annoying other people in the vicinity of the telephone.

For the reasons stated above, and for other reasons stated below which will become apparent to those skilled in the art upon reading and understanding the present specification, there is a need in the art for improved call routing systems.

DESCRIPTION OF EMBODIMENTS

Figure 1:
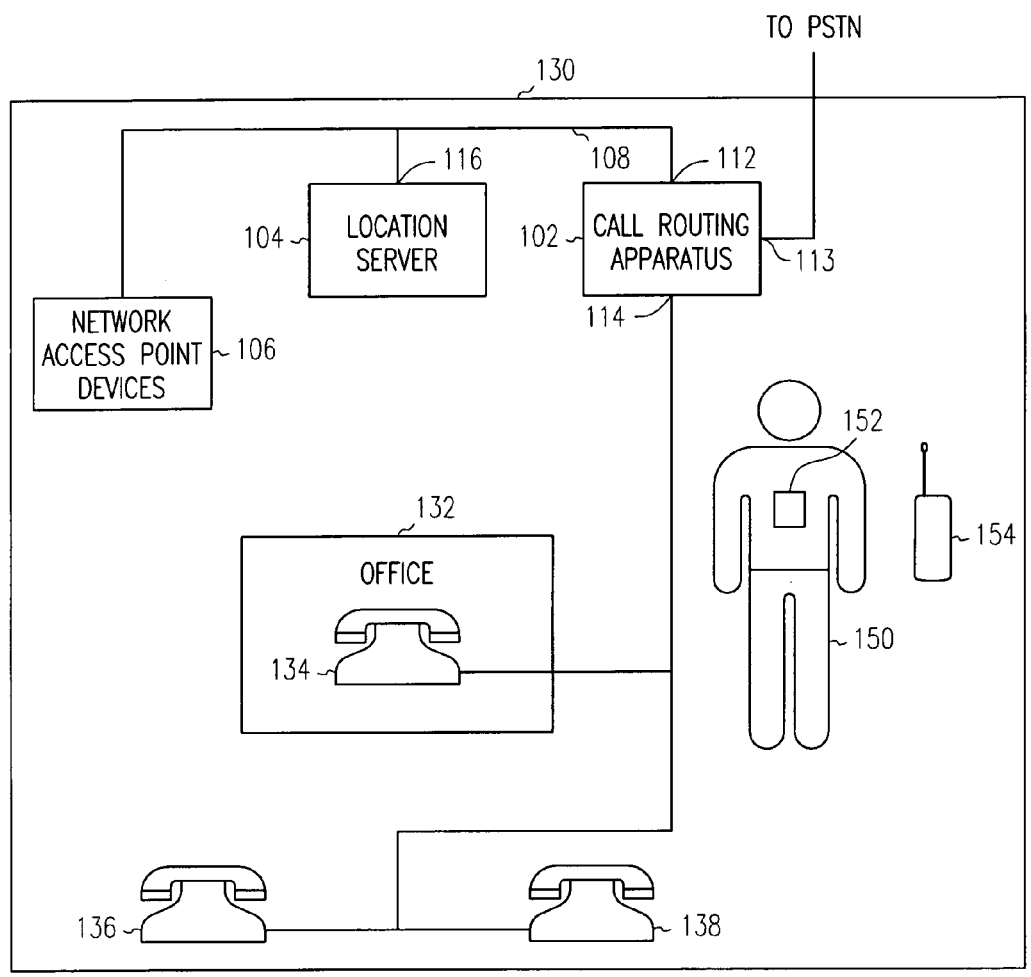
FIG. 1 shows a diagram of a network with a call routing apparatus.

In the following detailed description of the embodiments, reference is made to the accompanying drawings which show, by way of illustration, specific embodiments in which the invention may be practiced. In the drawings, like numerals describe substantially similar components throughout the several views. These embodiments are described in sufficient detail to enable those skilled in the art to practice the invention. Other embodiments may be utilized and structural, logical, and electrical changes may be made without departing from the scope of the present invention. Moreover, it is to be understood that the various embodiments of the invention, although different, are not necessarily mutually exclusive. For example, a particular feature, structure, or characteristic described in one embodiment may be included within other embodiments. The following detailed description is, therefore, not to be taken in a limiting sense, and the scope of the present invention is defined only by the appended claims, along with the full scope of equivalents to which such claims are entitled.

In various embodiments of the present invention as described in more detail below, a location-aware network provides services to aid in the routing of telephone calls to stationary phones, mobile phones, or voice-mail systems. The routing may be partially based on the location of the intended call recipient and the location of stationary and mobile phones.

FIG. 1 shows a diagram of a network with a call routing apparatus. The network includes location server 104, call routing apparatus 102, and network access point devices (NAPs) 106. Location server 104, call routing apparatus 102, and NAPs 106 are interconnected by media 108. Location server 104 is coupled to media 108 at port 116, and call routing apparatus 102 is coupled to media 108 at port 112. Media 108 may be any type of signal transmission media capable of providing a data communication path between server 104, call routing apparatus 102, and NAPs 106. Examples include, but are not limited to: wires, fiber optic cables, and wireless links.

Location server 104 and NAPs 106 form a location-aware network that may provide location-based services. For example, the location of various objects (e.g., mobile network nodes, asset tags, personnel tags, and phones) within network 100 may be located through the use of location server 104 and NAPs 106. Location-aware networks are described more fully with reference to later figures.

Call routing apparatus 102 may be any type of apparatus capable of routing a telephone call. For example, call routing apparatus 102 may be a private branch exchange (PBX). Also for example, call routing apparatus 102 may be any other type of routing apparatus capable of routing calls to stationary or mobile phones.

Also shown in FIG. 1 are outlines of building 130 and office 132, stationary telephones 134, 136, and 138, user 150, mobile telephone 154, and personnel tag 152. Building 130 may be any type of structure or area that includes phones. For example, building 130 may be an office building, a warehouse, or any other area that includes phones. Building 130 may also represent an arbitrary boundary that is outdoors. It is not necessary for the various objects shown in FIG. 1 to be indoors. User 150 is associated with stationary phone 134 in office 132. In an office environment, user 150 may be an employee that normally works in office 132, and normally uses stationary phone 134.

When a call enters call routing apparatus 102, call routing apparatus requests from location server 104 the location of the user associated with the original phone number dialed. For example, if a call intended for stationary phone 134 is received by call routing apparatus 102, call routing apparatus 102 may request the location of user 150 from location server 104. If user 150 is in or near office 132, call routing apparatus 102 may route the call to stationary phone 134. If, however, user is not in or near office 132, call routing apparatus 102 may route the call to another stationary phone, to mobile phone 154, to a voice-mail system, or to a designated alternative, such as a sectretary.

In some embodiments, the location-aware network may be able to determine the locations of stationary phones as well as mobile phones and users. In these embodiments, when a call for a user is received, call routing apparatus 102 has the option of routing the call to a stationary phone that is near user 150. Stationary phones may include a display capable of displaying the name or other identification of an intended call recipient. For example, if a call for user 150 is received, and user 150 is determined to be in close proximity to stationary phone 138, the call may be routed to stationary phone 138. In addition, stationary phone 138 may include a display mechanism that displays the name of the intended recipient. Further, personnel tag 152 may include a mechanism to alert user 150 to the call being received at the nearby stationary phone.

If user 150 is not near any stationary phones, call routing apparatus 102 may route the call to mobile phone 154 or may route the call to a voice-mail system. In some embodiments, when the location-aware network determines that user 150 is not near a stationary phone, but is near mobile phone 154, the call is routed to mobile phone 154. The call may be routed to mobile phone 154 via the public switched telephone network (PSTN), or may be routed through location-aware network. For example, mobile phone 154 may be a cellular phone that can be reached via the PSTN. Also for example, mobile phone 154 may be a phone compatible with the location-aware network, and location server 104 may route the call through one or more of NAPs 106.

Personnel tag 152 may be an asset tag that identifies user 150 as an "asset" to the location-aware network. Similarly, mobile phone 154 and the various stationary phones may also include asset tags or the equivalent to identify them as assets to the location-aware network. Any item may have an asset tag affixed thereto, or have an asset tag included as an integral component. Personnel tag 152 is one example of an asset tag being used to track an asset, which in this example, is user 150.

Figure 2:
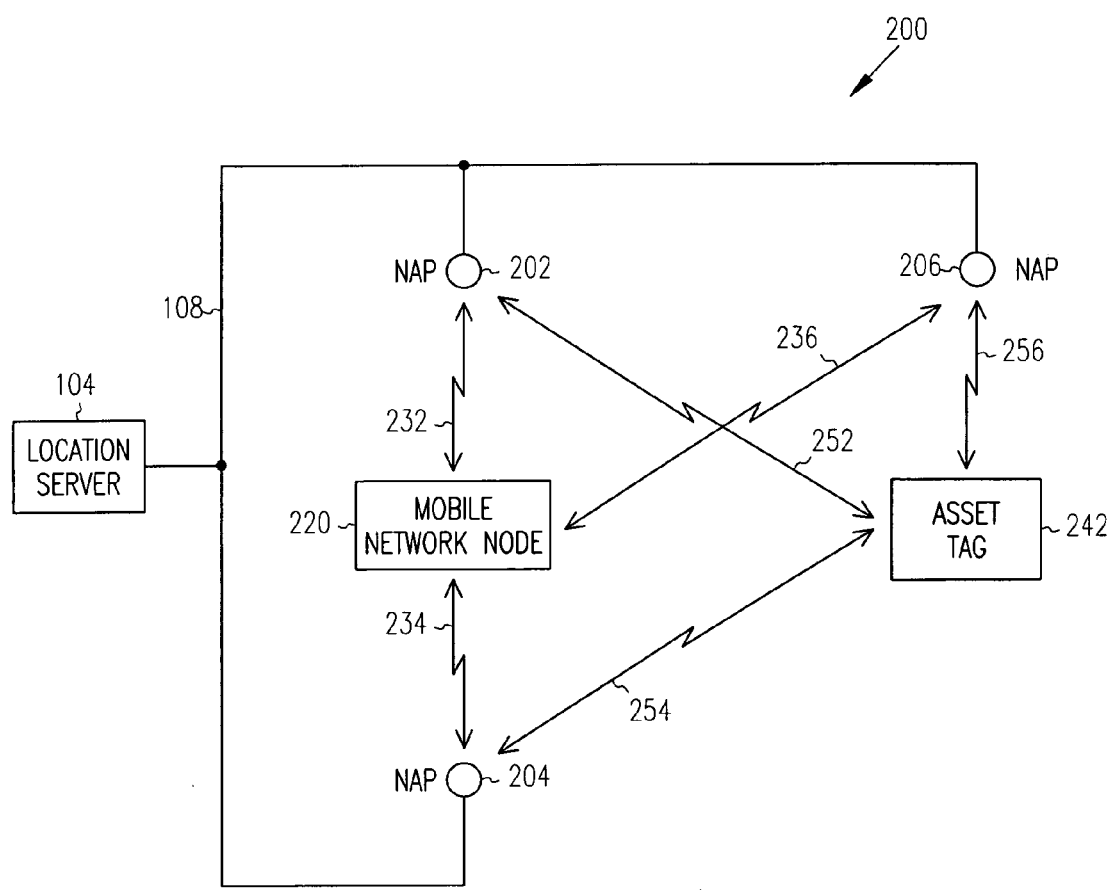
FIG. 2 shows a diagram of a location-aware network.

FIG. 2 shows a diagram of a location-aware network. Network 200 includes server 104, network access points (NAPs) 202, 204, and 206, mobile network node 220, and asset tag 242. Network access points 202, 204, and 206 are coupled to server 104 by media 108 as described above with reference to FIG. 1, and one or more of access points 202, 204, and 206 are coupled to node 220 by wireless links 232, 234, and 236. The combination of access points 202, 204, and 206, and server 104 provide network services to mobile network node 220 and asset tag 242. In addition, node 220 may, in some embodiments, provide network services to other nodes (not shown), or to any of access points 202, 204, and 206. Network access points 202, 204, and 206 correspond to NAPs 106 shown in FIG. 1.

Wireless network 200 may be any type of network that allows a node to access network services using a wireless link. For example, in some embodiments of the present invention, wireless network 200 represents a cellular telephone network, and in other embodiments, wireless network 200 represents a wireless local area network (WLAN) or wireless wide area network (WWAN). In still further embodiments, network 200 is a hybrid system that provides a combination of different services to network nodes and access points. For example, in some embodiments, wireless network 200 provides asset tracking services call routing apparatus such as call routing apparatus 102 (FIG. 1) or to mobile network nodes.

Asset tag 242 is an item that can be physically affixed to an asset that is tracked. For example, asset tag 142 may be affixed to a stationary phone or to a mobile phone. Further, asset tag 242 may be utilized as a personnel tag that allows the location of a user to be tracked. As described below, the location of asset tag 242 may be tracked by network 200, and the location of tracked assets may be communicated to network nodes such as mobile network node 220 or to a call routing apparatus (not shown).

Mobile network node 220 may be any type of network node capable of accessing network services using a wireless link. For example, node 220 may be a cellular telephone, a computer, a personal digital assistant (PDA), or any other type of device that can access a network using a wireless link. In some embodiments, node 220 may be a combination cellular phone and computer that provides both wireless data and voice services. In other embodiments, node 220 may be a device that displays asset tracking information to a user having access to node 220.

In general, nodes and access points are network elements that may provide network services, receive network services, or both. For example, in cellular network embodiments, access points 202, 204, and 206 may be cellular base stations that provide network services and node 220 may be a cellular telephone that primarily receives network services. Also for example, in wireless LAN embodiments, access points 202, 204, and 206, and node 220 may be computers that provide and receive network services. Also for example, mobile network node 220 may be a stationary phone such as those shown in FIG. 1.

In operation, network 200 provides the ability to determine the location of mobile network nodes and asset tags. Throughout this description, this ability is referred to as "location determination." Network 200 provides location determination of node 220 through the use of wireless links 232, 234, and 236. Network 200 also provides location determination of asset tag 242 through the use of wireless links 252, 254, and 256. Networks that provide location determination are referred to herein as "location-aware networks." Network 200 is a location-aware network that provides location determination of node 220 and asset tag 242 through the use of the various wireless links.

Wireless links 232, 234, and 236 provide communication paths between node 220 and access points 202, 204, and 206. Wireless links 252, 254, and 256 provide communication paths between asset tag 242 and access points 202, 204, and 206. The various access points send and receive wireless signals to and from node 220 and asset tag 242 on the wireless links, and also send and receive signals to and from server 104 using media 108. In some embodiments, network node 220 communicates with the network using only one of the wireless links shown, but multiple network access points receive the signals transmitted by network node 220.

In some embodiments, the wireless links utilize a pulse-based radio frequency (RF) protocol to provide communications between node 220 and access points 202, 204, and 206. In these embodiments, short RF pulses are transmitted by node 220 and asset tag 242, and these short RF pulses are received by access points 202, 204, and 206. In other embodiments, the wireless links utilize baseband modulated protocols in which the desired data to be transmitted is superimposed by various means on a sinusoidal carrier signal. One example of a suitable pulse-based protocol is the emerging ultra-wideband (UWB) protocol in which low power, short duration, pulses are transmitted over the wireless link. Another example of a suitable pulse-based protocol is described in U.S. Pat. No. 6,031,862, issued to Fullerton et al., on Feb. 29, 2000. In other embodiments, wireless links 232, 234, 236, 252, 254, and 256 utilize a data modulated sinusoidal carrier. Any type of wireless protocol may be utilized for the wireless links.

Information received from wireless network node 220 may include any information contained within the signals received from node 220. For example, the signals may contain voice information or data information, in any analog or digital format suitable for requesting or providing network services. Information received from asset tag 242 may also include any type of information. For example, an asset tag may send information representing a serial number, an asset description, or any other information of use to network 200.

When receiving wireless signals from node 220 and asset tag 242, the various access points may also gather information describing attributes of the wireless signals. For example, in pulse-based embodiments, the access points may gather pulse time-of-arrival, information as well as angle-of-arrival, pulse amplitude, pulse duration, and rise/fall time information. In sinusoidal carrier embodiments, the access points may gather center frequency, amplitude, angle-of-arrival, phase offset, or other information. In general, information gathered describing attributes of the received signals may include any information suitable to support location determination or asset tracking. For example, pulse time-of-arrival information or angle-of-arrival information, or both, may be used to determine the location of network node 220 relative to the locations of the access points. Also for example, phase offset of a received sinusoidal carrier signal may also be used in support of location determination.

Attributes of received wireless signals may be transmitted from the various access points to server 104. These attributes may then be used by server 104 to determine the locations of node 220 and asset tag 242. For example, in pulse-based embodiments, pulse time-of-arrival and optionally pulse angle-of-arrival information gathered by the access points may be used to resolve the locations of node 220 and asset tag 242 relative to the locations of the access points that measure the time-of-arrival and/or angle-of-arrival. Also for example, in sinusoidal carrier embodiments, phase offsets may be used to resolve the locations of node 220 and asset tag 242.

FIG. 2 shows three access points. In embodiments with three access points capable of receiving signals from node 220 and asset tag 242, the location of node 220 and asset tag 242 can be determined in two dimensions. Some embodiments have more than three access points. In embodiments with four or more access points capable of receiving signals from node 220 and asset tag 242, the location and orientation may be determined in three dimensions. In some embodiments, information about the environment may be combined with information from access points to determine the location of node 220. For example, information describing the placement of walls, ceilings, or obstructions may be combined with information from two network access points to determine the location of node 220 in two dimensions.

Figure 3:
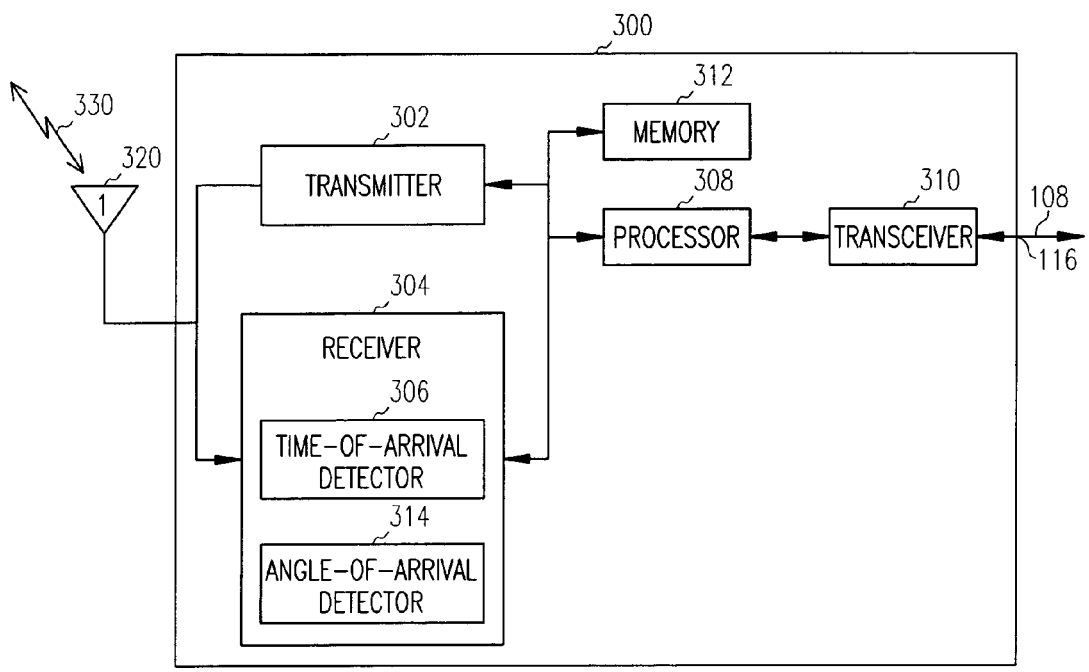
FIG. 3 shows a diagram of a network access point device.

FIG. 3 shows a diagram of a network access point device suitable for use at the network access points shown in FIG. 2. Network access point device 300 includes transmitter 302, receiver 304, time-of-arrival detector 306, angle-of-arrival detector 314, processor 308, and transceiver 310. Transceiver 310 communicates with a server (not shown) using media 108. Transceiver 310 also communicates with processor 308. Transmitter 302 and receiver 304 both communicate with processor 308 and antenna 320.

Antenna 320 receives wireless signals from network nodes and asset tags on wireless link 330. In some embodiments, wireless signals on wireless link 330 include electromagnetic pulses as described above with reference to FIG. 2. In these embodiments, receiver 304 receives the pulses, and time-of-arrival detector 306 detects the arrival time of the pulse. Time-of-arrival information is one of many possible attributes of a wireless signal that may be measured by receiver 304. For example, in some embodiments, angle-of-arrival detector 314 detects the angle from which the pulse arrived as an attribute of the wireless signal. Some embodiments measure both time-of-arrival and angle-of-arrival. Processor 308 receives information describing the wireless signal from receiver 304 and provides it to a network server using transceiver 310.

Time-of-arrival detector 306 maybe implemented in a number of different ways. In one embodiment, the function of the time-of-arrival detector is a separate module within the network access point device 300. In other embodiments, time-of-arrival detector 306 is integrated into receiver 304. In yet other embodiments, time-of-arrival detector 306 utilizes processing capabilities of processor 308 to perform its function.

Angle-of-arrival detector 314 can also be implemented in a number of different ways. In some embodiments, angle-of-arrival detector 314 is a circuit that receives signals from a phased-array antenna to measure the angle from which the signals are received. In these embodiments, antenna 320 may represent a phased-array antenna. Many other mechanisms may be used to measure the angle-of-arrival of the wireless signal.

Processor 308 may be any type of processor suitable to perform actions to support the operation of network access point device 300. For example, processor 308 may be a microprocessor, a microcontroller, or the like. Also for example, processor 308 may be a hardware controller or a collection of hardware controllers that perform specific task. Memory 312 represents an article that includes a machine-accessible medium. For example, memory 312 may represent any one or more of the following: a hard disk, a floppy disk, random access memory (RAM), read only memory (ROM), flash memory, CDROM, or any other type of article that includes a medium readable by a machine. Memory 312 may store instructions for performing the execution of the various method embodiments of the present invention. Memory 312 may also include data describing the current state of network access point device 300 and the entire network.

When multiple network access point devices 300 measure attributes of a single electromagnetic pulse, a network server may utilize this information to resolve the location of the network node from which the pulse originated. In some embodiments, multiple electromagnetic pulses are received by receiver 304. The multiple electromagnetic pulses may represent any type of communication from a network node. For example, a group of pulses may represent a request from a network node to locate a particular asset. Also for example, a group of pulses may represent a different data communication from a network node. Receiver 304 derives information from groups of pulses, as well as from attributes describing the pulses. Processor 308 receives from receiver 304 information describing both groups of pulses as well as attributes of individual pulses. For example, processor 308 may receive data from a network node, as well as receiving time-of-arrival and angle-of-arrival information of pulses received by receiver 304.

Figure 4:
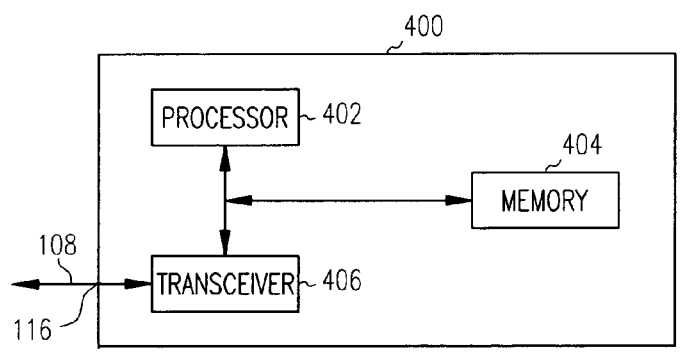
FIG. 4 shows a diagram of a network server.

FIG. 4 shows a diagram of a network server suitable for use in a wireless network such as network 100 (FIG. 1) or network 200 (FIG. 2). Server 400 includes processor 402, memory 404, and transceiver 406. Transceiver 406 is coupled to media 108 at port 116. As described above with reference to FIG. 1, media 108 couples the network server with any number of network access point devices such as network access point device 300 (FIG. 3). Transceiver 406 receives information from network access point devices on media 108. In some embodiments, wireless signal attributes are received from multiple network access point devices, and processor 402 determines the location of a transmitter from which the wireless signals originated. Server 400 may be a personal computer (PC), server, mainframe, handheld device, portable computer, or any other system that may perform the operations described herein.

Memory 404 represents an article that includes a machine-accessible medium. For example, memory 404 may represent any one or more of the following: a hard disk, a floppy disk, random access memory (RAM), read only memory (ROM), flash memory, CDROM, or any other type of article that includes a medium readable by a machine. Memory 404 may store instructions for performing the execution of the various method embodiments of the present invention. Memory 404 may also include data describing the current state of server 400 and the entire network. For example, memory 404 may include data describing assets, asset serial numbers, locations of assets, as well as the locations of network nodes.

Figure 5:
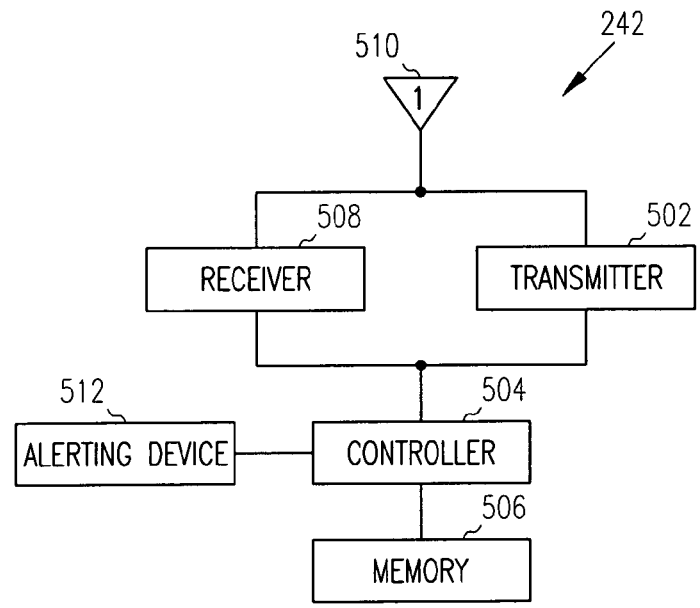
FIG. 5 shows a diagram of an asset tag.

FIG. 5 shows a diagram of an asset tag. Asset tag 242 is an asset tag suitable for use in a location-aware network such as network 100 (FIG. 1) or network 200 (FIG. 2). Asset tag 242 may be used as a personnel tag such as personnel tag 152 (FIG. 1), or may be an asset tag affixed to assets such as mobile phone 154 (FIG. 1) or the various stationary phones shown in FIG. 1. Asset tag 242 includes transmitter 502, receiver 508, controller 504, alerting device 512, and memory 506. Transmitter 502 is a transmitter capable of transmitting wireless signals using antenna 510, and receiver 508 is a receiver capable of receiving wireless signals using antenna 510. Asset tag 242 sends wireless signals to network access points, and the network determines the location of the asset tag. As shown in FIG. 2, asset tag 242 sends and receives wireless signals 252, 254, and 256. In some embodiments, receiver 508 is omitted, and asset tag 242 only sends the wireless signals.

Alerting device 512 may be an alphanumeric display, a light emitting diode (LED), a buzzer, a vibrating device, or the like. In some embodiments, alerting device 512 alerts a user that that he or she is the intended recipient of a phone call. For example, in some embodiments, when asset tag 242 is part of a personnel tag, a buzzer or vibrator may alert the person wearing the personnel tag that a nearby phone is ringing for him. Also for example, when asset tag 242 is affixed to a stationary phone, an alphanumeric display may display the name or other identification of an intended call recipient. In some embodiments, alerting device 512 is omitted.

Controller 504 may be any type of controller, and memory 506 may be any kind of memory. For example, controller 504 may be a microprocessor, a microcontroller, or the like. Also for example, controller 504 may be a hardware controller or a collection of hardware controllers that perform a specific task. Memory 506 represents an article that includes a machine-accessible medium. For example, memory 506 may represent any one or more of the following: a hard disk, a floppy disk, random access memory (RAM), read only memory (ROM), flash memory, CDROM, or any other type of article that includes a medium readable by a machine. Memory 506 may store instructions for performing the execution of the various method embodiments of the present invention. Memory 506 may also include information related to an asset such as a serial number or an asset description. In some embodiments, memory 506 may be a dedicated write-only memory that is inexpensively produced.

Figure 6:
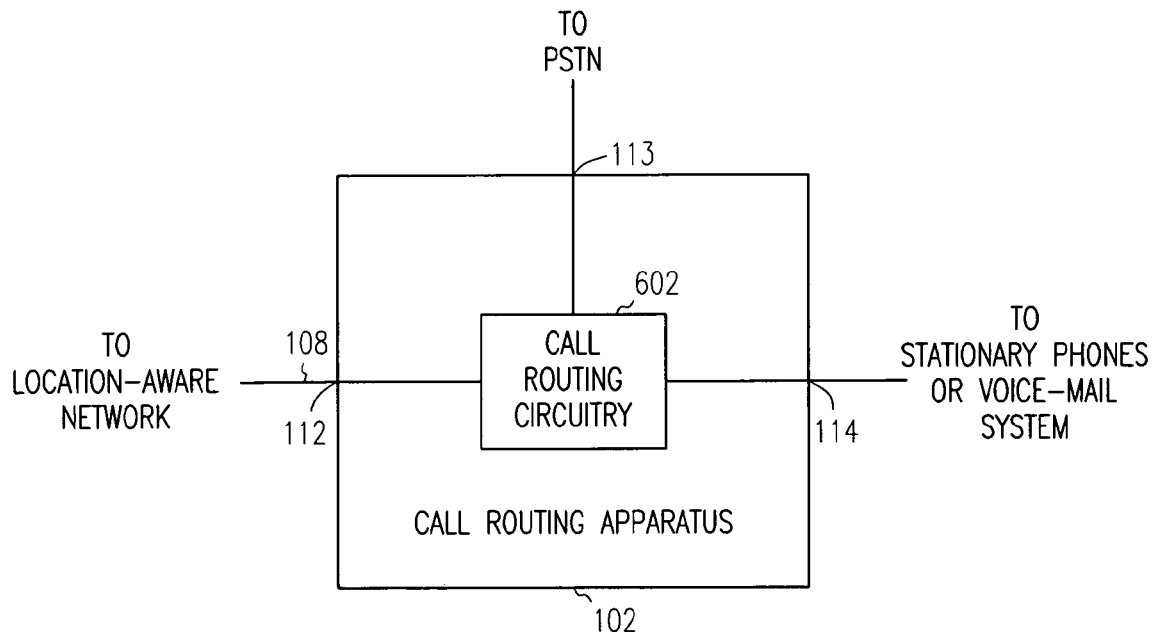
FIG. 6 shows a diagram of a call routing apparatus.

FIG. 6 shows a diagram of a call routing apparatus. Call routing apparatus 102 includes call routing circuitry 602 coupled to ports 112, 113, and 114. Port 112 is coupleable to media 108, which allows communication with a location-aware network. Port 114 is coupleable to stationary phones, and port 113 is coupleable to a public switched telephone network (PSTN).

In operation, call routing apparatus 102 may receive an indication of a call from the PSTN. Call routing apparatus 102 may request the location of the intended call recipient from the location-aware network, and then route the call accordingly. For example, if the location-aware network reports that the intended call recipient is near a stationary phone, call routing circuitry 602 may route the call to a stationary phone using port 114. Also for example, if the location-aware network reports that the intended call recipient is not near a stationary phone, call routing circuitry 602 may route the call to a mobile phone, to a voice-mail system, or to a designated alternative such as a secretary.

In some embodiments, a call may be routed to a mobile phone through the PSTN, which may route the call through a cellular phone network. In other embodiments, a call may be routed to a mobile phone through the location-aware network. In further embodiments, call routing apparatus 102 may include a wireless interface to route calls to mobile phones directly.

Figure 7:
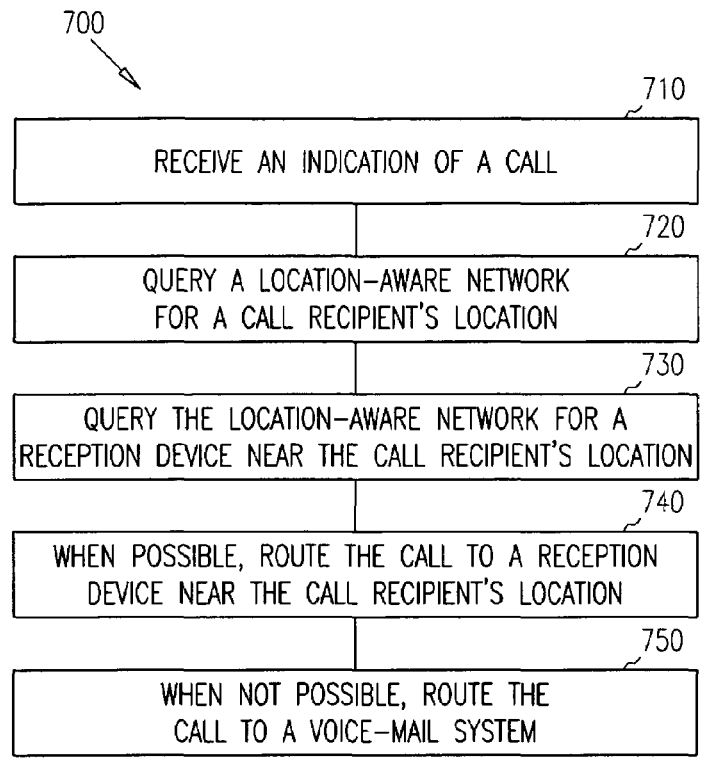
FIGS. 7 and 8 show flowcharts in accordance with various embodiments of the present invention.
Figure 8:
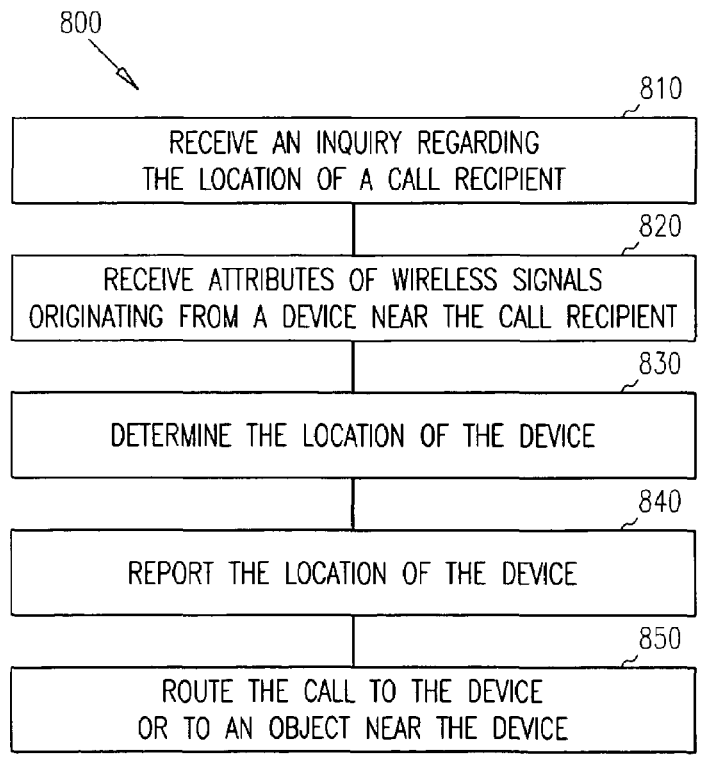

FIGS. 7 and 8 show flowcharts in accordance with various embodiments of the present invention. The flowcharts shown in FIGS. 7 and 8 illustrate various method embodiments that may be performed in networks such as those previously described. In some embodiments, the methods may be performed by a server such as server 400 (FIG. 4), or by a call routing apparatus such as call routing apparatus 102 (FIGS. 1, 6), or by network access points. In other embodiments, the methods may be distributed across a server, a call routing apparatus, and network access point devices. The various actions shown in the figures may be performed in the order presented, or may be performed in a different order. Further, in some embodiments, some actions listed in the figures are omitted.

Referring now to FIG. 7, method 700 begins at 710 when an indication of a call is received. In some embodiments, this corresponds to a call routing apparatus receiving a call for an intended recipient. At 720, a location-aware network is queried for the intended recipient's location. Referring now back to FIG. 1, this may correspond to call routing apparatus 102 querying location server 104 for the location of user 150. If user 150 is accompanied by an asset tag such as personnel tag 152, or by another device that is locatable by the network, location server 104 may report the location of user 150 to call routing apparatus 102.

At 730, the location-aware network is queried for a reception device near the call recipient's location. Referring again now back to FIG. 1, location server 104 may have information regarding the locations of stationary and mobile phones. For example, location server 104 may have information regarding the location of stationary phones 134, 136, and 138, and may also have information regarding the location of mobile phone 154. Location server 104 may report the location of the phone closest to user 150, or may report the locations of multiple phones.

At 740, the call is routed to a reception device near the call recipient's location when possible, otherwise the call is routed to a voice-mail system at 750. The call may be routed to a stationary phone, a pager, a mobile phone, or any other suitable reception device. In some embodiments, the reception device is influenced to display the identity of a call recipient. For example, when the reception device is a stationary telephone, information is sent to the stationary telephone to influence it to display the name of the intended call recipient. In other embodiments, an alerting device in an asset tag is influenced to alert a user that a call coming in to a nearby phone is intended for him. For example, referring back to FIG. 1, when user 150 is an intended call recipient, an alerting device in personnel tag 152 may alert user 150 that he is the intended recipient for a call coming in to stationary phone 138.

Referring now to FIG. 8, method 800 begins at 810 when an inquiry regarding the location of a call recipient is received. At 820, attributes of wireless signals originating from a device near the call recipient are received. This may correspond to a location server receiving attributes from a plurality of wireless network access point devices. For example, referring back to FIG. 1, personnel tag 152 may transmit wireless signals to network access point devices 106. Network access point devices 106 may measure attributes of those wireless signals, and send information describing the attributes to location server 104.

At 830, the location of the device is determined, and at 840, the location of the device is reported in response to the inquiry made at 810. This may correspond to location server 104 determining the location of personnel tag 152 or mobile phone 154, and reporting the location to call routing apparatus 102. At 850, the call is routed to the device or to an object near the device. For example, if the device is a stationary phone, the call may be routed to the stationary phone. If the device is a personnel tag, the call may be routed to a nearby stationary phone, or to a mobile phone.

As described above, the location-aware networks referred to in FIGS. 7 and 8 may utilize pulse arrival times or angles-of-arrival to resolve the position of mobile or stationary telephones, asset tags, or personnel tags. Also, calls may be routed through the location-aware network, or may be routed through a different mechanism, such as the PSTN.

It is to be understood that the above description is intended to be illustrative, and not restrictive. Many other embodiments will be apparent to those of skill in the art upon reading and understanding the above description. The scope of the invention should, therefore, be determined with reference to the appended claims, along with the full scope of equivalents to which such claims are entitled.

What is claimed is:

1. A method comprising:
   receiving an indication of a call;
   locating a call recipient's location in a location-aware network through a wireless asset tag associated with the call recipient;
   querying the location-aware network for the call recipient's location;
   routing the call to a stationary phone near the call recipient's location; and
   influencing the stationary phone to display an identity of the call recipient.

2. The method of claim 1 further comprising:
   when the location-aware network is unable to locate the call recipient's location, routing the call to a voice-mail system.

3. An article comprising a computer-readable medium having associated computer instructions, wherein the computer instructions, when executed by a computer, result in the computer performing:
   receiving an inquiry regarding a location of a call recipient;
   receiving attributes of wireless signals originating from a wireless device near the call recipient;
   determining the location of the wireless device;
   reporting the location of the wireless device;
   routing a call to a stationary telephone near the wireless device; and
   influencing the stationary telephone to display an identity of the call recipient.

4. The article of claim 3 wherein the wireless device is an asset tag affixed to a stationary phone.

5. The article of claim 3 wherein the wireless device is a personnel tag.

6. The article of claim 5 wherein the wireless signals comprise electromagnetic pulses.

7. The article of claim 6 wherein the personnel tag includes a transmitter and determining the location of the wireless device comprises resolving the location using pulse arrival times.

8. The article of claim 6 wherein the electromagnetic pulses are transmitted according to an ultra-wideband (UWB) protocol.

9. The article of claim 3 wherein the wireless device comprises a mobile phone.

10. The article of claim 3 wherein the attributes comprise arrival times of electromagnetic pulses received at a plurality of network access points.

11. A network server comprising:
    a port coupleable to a phone call routing apparatus to receive an inquiry of a call recipient's location;
    a transceiver coupleable to a plurality of network access point devices to receive attributes of wireless signals from a wireless device near the call recipient;
    a processor to determine the call recipient's location from the attributes;
    wherein the network server is configured to:
      route a call to a stationary phone near the call recipient's location through one of the plurality of network access point devices; and
      influence the stationary phone to display an identity of the call recipient.

12. The network server of claim 11 wherein the transceiver is configured to receive time-of-arrival information describing arrival times of electromagnetic pulses at the plurality of network access point devices.

13. The network server of claim 11 wherein the transceiver, the network access point devices, and the processor comprise a location-aware network.

14. The network server of claim 11 wherein the processor is configured to report the call recipient's location to the phone call routing apparatus.

15. The network server of claim 14 wherein the processor is further configured to report an identity of at least one telephone in proximity to the call recipient's location.

16. A telephone call routing apparatus comprising:
    a location-aware network to locate a call recipient's location through a wireless asset tag associated with the call recipient;
    a first port coupleable to a public switched telephone network to receive a call;
    a second port coupleable to the location-aware network to request the call recipient's location; and
    call routing circuitry to:
      route the call to a stationary telephone near the call recipient's location; and
      influence the stationary telephone to display an identity of the call recipient.

17. The telephone call routing apparatus of claim 16 wherein the telephone call routing apparatus is configured to request locations of telephones near the call recipient's location.

18. The telephone call routing apparatus of claim 17 wherein the call routing circuitry is configured to route the call to a voice-mail system when the location-aware network is unable to locate the call recipient's location.

19. A wireless network comprising:
    a plurality of wireless network access point devices, each of the plurality of wireless network access point devices including circuitry to measure attributes of received signals from a wireless device near a call recipient; and
    a server coupled to the plurality of wireless network access point devices, the server configured to receive an inquiry for the call recipient's location from a telephone system, to determine the call recipient's location from the attributes of the received signals, to route a telephone call through one of the plurality of wireless network access point devices to a stationary telephone near the call recipient's location, and to influence the stationary telephone to display an identity of the call recipient.

20. The wireless network of claim 19 wherein the server is configured to determine a location of the stationary telephone from attributes of wireless signals transmitted by the stationary telephone.

21. The wireless network of claim 19 wherein the telephone system further comprises a call routing apparatus.

* * * * *